No. 832,692. PATENTED OCT. 9, 1906.
J. W. McCONNELL.
ATTACHMENT FOR ICE CREAM FREEZING MACHINES.
APPLICATION FILED AUG. 21, 1905.
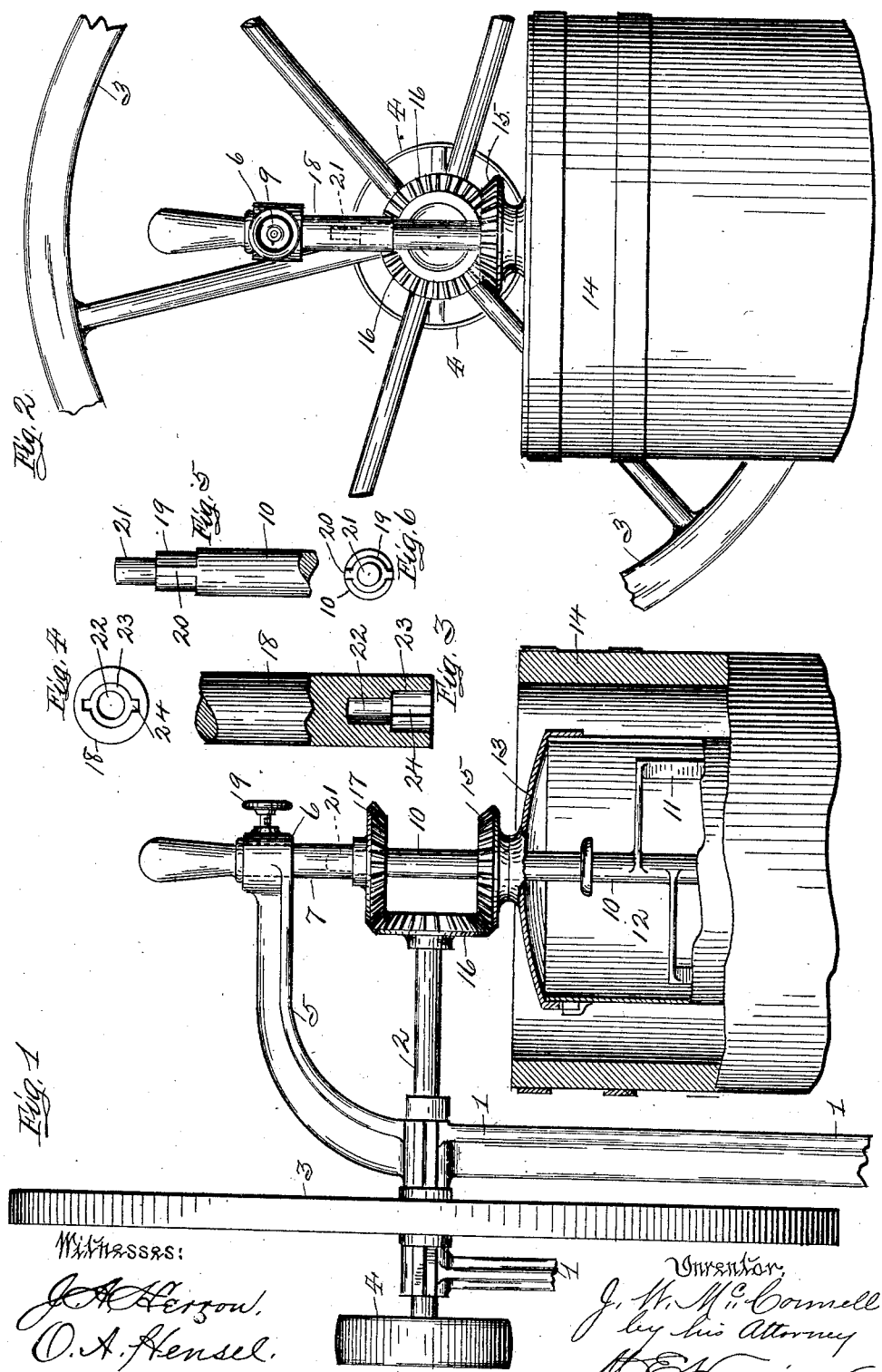

UNITED STATES PATENT OFFICE.

JOHN WILLIAM McCONNELL, OF PARNASSUS, PENNSYLVANIA.

ATTACHMENT FOR ICE-CREAM-FREEZING MACHINES.

No. 832,692.     Specification of Letters Patent.     Patented Oct. 9, 1906.

Application filed August 21, 1905. Serial No. 275,075.

*To all whom it may concern:*

Be it known that I, JOHN WILLIAM MCCONNELL, a citizen of the United States, residing at Parnassus, in the county of Westmoreland and State of Pennsylvania, have invented certain new and useful Improvements in Attachments for Ice-Cream-Freezing Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to an improved attachment to machines used in the manufacture of ice-cream; and it consists in a means whereby the receptacle and paddle may be revolved together in opposite directions or one or the other held stationary for the purpose of whipping the cream, together with the certain details of construction and combination of parts, as will be fully described hereinafter.

In the improved machines for manufacturing ice-cream, wherein the receptacle containing the cream is rotated in one direction and the paddle of the same in another, the cream when properly frozen is in granular form and without that degree of fineness suitable for the market, rendering it necessary to reduce and break into minute particles this granular condition and give the finished article a smooth even texture. This has been accomplished by whipping or "paddling" the cream in various ways by the use of suitable implements or tools involving considerable labor. By the use of my attachment much of this labor is avoided and the operation of reducing the cream to the proper degree of fineness reduced to the minimum.

In the accompanying drawings, Figure 1 is a side elevation of a machine adapted for use in the manufacture of ice-cream, a part of which is broken away. Fig. 2 is an end elevation of said machine converted into a machine for paddling the cream in accordance with my invention. Fig. 3 is an enlarged sectional view of the lower portion of the pin used to hold the paddle stationary. Fig. 4 is an inverted plan view of the same. Fig. 5 is a detailed side elevation of the upper portion of the paddle-stem, showing the means by which connection may be made either with the gear for revolving the paddle or holding said paddle stationary. Fig. 6 is a plan view of the same.

To put my invention into practice with a machine for manufacturing ice-cream, the said machine being of any well-known type, comprising a frame 1, in which is mounted in suitable bearings a horizontally-disposed power-shaft 2, provided with a fly-wheel 3 and drive-pulley 4, connected, by means of a belt, with suitable motive power, this frame 1 is fitted with an overhanging arm or bracket 5, having a bearing 6 arranged over the center of a tub 14 and receptacle 12, in which the cream to be operated upon is placed. This receptacle and tub are of usual form, the former being fitted with a lid or cover 13, adapted to be locked to said receptacle and having attached thereto a bevel-gear 15, which may be moved in or out of mesh with a similar gear 16, rigidly fixed to the inner end of the drive-shaft 2. Centrally arranged within the receptacle 12 is a shaft 10, having radiating paddles 11, the lower end of said shaft being arranged in a socket (not shown) and the upper extremity projecting through the hub of the gear-wheel 15 in a manner that will permit the said shaft to revolve freely therein. The upper portion of this paddle-shaft 10 (see Figs. 5 and 6) is formed with a reduced portion 19, having opposite-disposed radial lugs 20, which register with grooves formed in the central bore of the bevel-gear 17 when placed upon said reduced portion, thereby locking said shaft and gear to rotate in unison. Above this reduced portion 19 a further reduction is made in the diameter of the shaft 10 to form a shoulder and pin 21, which is designed to enter a socket formed in the lower end of a removable pin 7, held in a vertical position in the bearing 6. The said pin when in position, as shown at Fig. 1 of the drawings, forms the upper support for the paddle-shaft 10.

The operation of the above-described machine is analogous with many others now in common use. The power transmitted from the pulley 4 will cause the receptacle 12 to revolve in one direction and the paddles 11 in another, stirring and agitating the cream during the process of freezing in a manner well known in the art.

I now provide a second pin (see Figs. 4 and 5) somewhat longer than that used for holding the gear-wheel 17, comprising a body portion or shank 18, having at its lower end a double socket of large and small diameter, the inner socket 22 of which serves to receive the reduced portion 21 of the paddle-shaft 10, and the outer socket 23 being formed with opposite-disposed vertically-arranged grooves 24, serves to receive and inclose the reduced portion 19 of the same shaft.

To whip or paddle the cream, as produced by the first operation, the set-screw 9 is released and the pin 7 and bevel-gear 17 removed from the shaft 10 and bearing 6. The second or last-described pin 18 is now entered through the bearing 6 and the double socket of the same engaged with the paddle-shaft 10, as will be seen by reference to Fig. 2, and said pin held rigid by tightening the set-screw 9. The drive-shaft 2 is now given a rotatable movement which causes the receptacle 12 to revolve through the medium of the gear-wheels 15 and 16, the paddles 11 being held stationary by the connected pin 18. This rotatable movement of the receptacle 12 is continued until the cream has been thoroughly worked or paddled by the action of the stationary paddle on the moving cream within.

It is obvious that means may be provided for holding the receptacle 12 stationary and permit the paddles to revolve and that various other slight modifications and changes may be made in the details of construction without departing from the spirit of the invention. Therefore I do not wish to confine myself to the exact construction shown and described, but wish to claim all such modified forms as would come properly within the general scope of the invention.

Having thus described my invention, what I claim, and desire to secure by Letters Patent, is—

1. In combination with a machine for making ice-cream, comprising a receptacle and a shaft with connected paddles, means for rotating said shaft, and interchangeable means comprising removable pins with sockets of different length, one pin being provided with means for supporting said shaft while it is being rotated and the other pin being provided with a means for holding said shaft from rotation.

2. An ice-cream-freezing machine consisting of a frame, a rotatable drive-shaft mounted therein, a receptacle for containing the cream, a shaft with paddles operating therein, gear connections connecting said shaft with the drive-shaft, said paddle-shaft having formed on its upper end reduced portions 19 and 21, one of which is provided with a radial projection for engagement with the gear connections for rotating the paddle-shaft and for engagement with a pin for holding the paddle-shaft from rotation.

3. The combination, with an ice-cream-freezing machine, comprising a rotatable receptacle and a normally rotatable paddle-shaft therein, of a removable pin provided with means for engaging the end of the paddle-shaft to hold it from rotation.

4. An ice-cream-freezing machine consisting of a frame, a rotatable drive-shaft mounted therein, means for rotating said shaft, a receptacle for containing the cream, a shaft with paddles operating therein, gear connections connecting said shaft with the drive-shaft, and interchangeable pins, one of which is provided with means for supporting said paddle-shaft while it is being rotated, and the other with means for supporting and holding the said shaft against rotation, as and for the purpose described.

5. An ice-cream-freezing machine consisting of a frame, a rotatable drive-shaft mounted therein, a receptacle for containing the cream, a shaft with paddles operating therein, gear connections connecting said shaft with the drive-shaft, interchangeable pins, one of which is adapted to engage with the upper reduced portion 21 of the paddle-shaft and the other with adjacent reduced part 19 of the same shaft, whereby said shaft may be rotated or held from rotation as described In testimony whereof I affix my signature in presence of two witnesses.

JOHN WILLIAM McCONNELL.

Witnesses:
    E. J. BAXTER,
    R. C. SWANK.